United States Patent
Kawakami

[11] Patent Number: 5,335,412
[45] Date of Patent: Aug. 9, 1994

[54] WORKING DEVICE FOR FORCING ARMATURE SHAFT

[75] Inventor: Yasushi Kawakami, Kiryu, Japan

[73] Assignee: Mitsuba Electric Mfg. Co., Ltd., Kiryu, Japan

[21] Appl. No.: 989,041

[22] Filed: Dec. 10, 1992

[30] Foreign Application Priority Data

Dec. 18, 1991 [JP] Japan .............................. 3-104512[U]

[51] Int. Cl.⁵ .............................................. H02K 15/02
[52] U.S. Cl. ....................................... 29/564.1; 29/598; 29/732; 29/785; 29/786
[58] Field of Search ................. 29/596, 598, 732, 733, 29/736, 785, 786, 564.1, 564.7, 525

[56] References Cited

U.S. PATENT DOCUMENTS 2,092,786  9/1937  Taylor ..................... 29/785 X
2,390,170 12/1945  Poole ......................... 29/732

Primary Examiner—Carl E. Hall
Attorney, Agent, or Firm—Darby & Darby

[57] ABSTRACT

A working device for forcing an armature shaft is disclosed. The working device comprises a sub-index and a main index. The sub-index has a first stopping position adjacent to a shaft storage means for storing armature shafts, and a second stopping position adjacent to a knurl-working means for carrying out a knurl-working to the armature shaft. The main index has a core-feed stopping position at which an armature core is fed by an armature core feed means, a shaft-forcing stopping position at which the armature shaft supplied from the sub-index side is forced into the through-hole of the armature core by a shaft-forcing means, and a discharge stopping position from which the armature core with the forced armature shaft is discharged outside of the main index.

16 Claims, 5 Drawing Sheets

WORKING DEVICE FOR FORCING ARMATURE SHAFT

BACKGROUND OF THE INVENTION

1. Industrial Field of the Invention

The present invention relates to a working device which can carry out a knurl-working to an armature shaft and can force the armature shaft into the through-hole of an armature core for a motor.

2. Related Art

Conventionally, an armature shaft has been attached to an armature core for a motor by forcing the armature shaft into the through-hole of the armature core after knurl-working of the armature shaft, in order to prevent rotation of the armature shaft with respect to the armature core. In this case, the step of the knurl-working is independent of the step of forcing the armature shaft into the through-hole of the armature core. The knurl worked armature shaft is supplied to an armature shaft forcing machine by the aid of human power after the direction of the armature shaft is correctly selected by the aid of human power. Thereafter, the armature shaft is forced into the through-hole of the armature core by means of the armature shaft forcing machine. Thus, the knurl-working for the armature shaft and the forcing of the armature shaft into the through-hole of the armature core are carried out by steps different from each other.

The knurl-working is carried out on the armature shaft asymmetrically with respect to the center of the length. That is, the knurl-working is carried out on the portion of the armature shaft except the portions in the vicinity of both ends thereof. Each of the non-knurl-working portions, in the vicinity of both ends of the armature shaft, has a different length to each other.

In order to force the armature shaft into the through-hole of the armature core, the so-called constant-length forcing system has been generally adopted. In this system, an armature shaft is forced into the through-hole of an armature core which is supported on the predetermined position, by a press machine having a hydraulic cylinder, to knock the armature shaft against a stopper fixed at a predetermined position. Consequently, the position of the armature shaft, relative to the armature core, can be determined.

The knurl-working is carried out on the portion of the armature so that each of the non-knurl-working portions in the vicinity of both ends of the armature shaft is different from each other, so that the armature shaft has a correct direction for forcing. However, the armature shaft has often been forced into the through-hole of an armature core in the wrong direction.

When various kinds of armature shafts are forced into the through-holes of armature cores, it is necessary to take account of the kind of armature shaft and the direction of the shaft. Therefore, the kind of armature shaft and the forcing direction of the shaft have been ascertained by the aid of human power. However, this determination not only requires a long time, but can also result in the possibility of making an incorrect ascertainment, with respect to the kind of armature shaft and the forcing direction of the shaft.

SUMMARY OF THE INVENTION

The present invention was developed in view of the above circumstances.

It is an object of the present invention to provide an improved working device which can automatically force the armature shaft into the through-hole of an armature core precisely without the aid of human power.

It is another object of the present invention to provide an improved working device which can carry out a knurl-working to the armature shaft and can force the armature shaft into the through-hole of an armature core.

In order to achieve the above objects of the present invention, there is provided a working device for forcing an armature shaft comprising: a sub-index which can support an armature shaft to transfer to predetermined plural stopping positions, the sub-index having a first stopping position adjacent to a shaft storage means for storing armature shafts, and a second stopping position adjacent to a knurl-working means for carrying out a knurl-working to the armature shaft; a main index which can support an armature core to transfer to predetermined plural stopping positions, the main index having a core feed stopping position at which an armature core is fed by an armature core feed means, a shaft forcing stopping position at which the armature shaft supplied from the sub-index side is forced into the through-hole of the armature core by a shaft forcing means, and a discharge stopping position from which the armature core with the forced armature shaft is discharged outside of the main index.

In the working device for forcing an armature shaft of the present invention, the armature shaft picked up from the shaft storage means is transferred to the second stopping position by the sub-index at which the shaft is knurl-worked. The armature core is transferred to a plurality of stopping positions by the main index. The knurl-worked shaft is supplied from the sub-index side to the armature core supported by the main index, and is completely forced into the through-hole of the armature core. Thereafter, the armature core with the forced armature shaft is discharged outside of the main index.

In this case, it is preferable that the sub-index is horizontally rotatable and has a plurality of radiating arms which extend in the horizontal direction with predetermined spaces, and which can support an armature shaft horizontally. It is preferable that the sub-index can be transferred in the vertical direction.

Furthermore, the sub-index preferably further has a stopping position adjacent to a first shaft forcing means for provisionally inserting the armature shaft into the through-hole of an armature core.

The sub-index preferably further has a stopping position adjacent to a length measuring means for measuring the length of the armature shaft.

It is preferable that the knurl-working means performs a knurl-working on the armature shaft asymmetrically with respect to the center of the length thereof.

The main index preferably has a horizontally rotatable turn-table on the periphery of which a plurality of core positioning portions for positioning the armature core are provided at approximately equal spaces.

Furthermore, the shaft-forcing stopping position preferably comprises a first shaft forcing stopping position at which the armature shaft is provisionally inserted into the through-hole of the armature core by the first shaft forcing means, and a second shaft forcing stopping position at which the inserted armature shaft is completely forced into the through-hole of the armature core up to a predetermined depth by a second shaft forcing means.

According to the improved working device of the present invention, it is possible to automatically, i.e., without the aid of human power, force the armature shaft into the through-hole of the armature core without the possibility of making an incorrect ascertainment, with respect to the forcing direction. In addition, the working device according to the present invention does not require a long time for forcing the armature shaft into the through-hole of the armature core.

It is preferable that the rotation of the sub-index for transferring an armature shaft is carried out at a height different from that of the rotation of the main index for transferring an armature core.

DETAILED DESCRIPTION OF THE PRESENT INVENTION

An embodiment of the present invention will be explained with reference to FIGS. 1 through 5.

Figure 1:
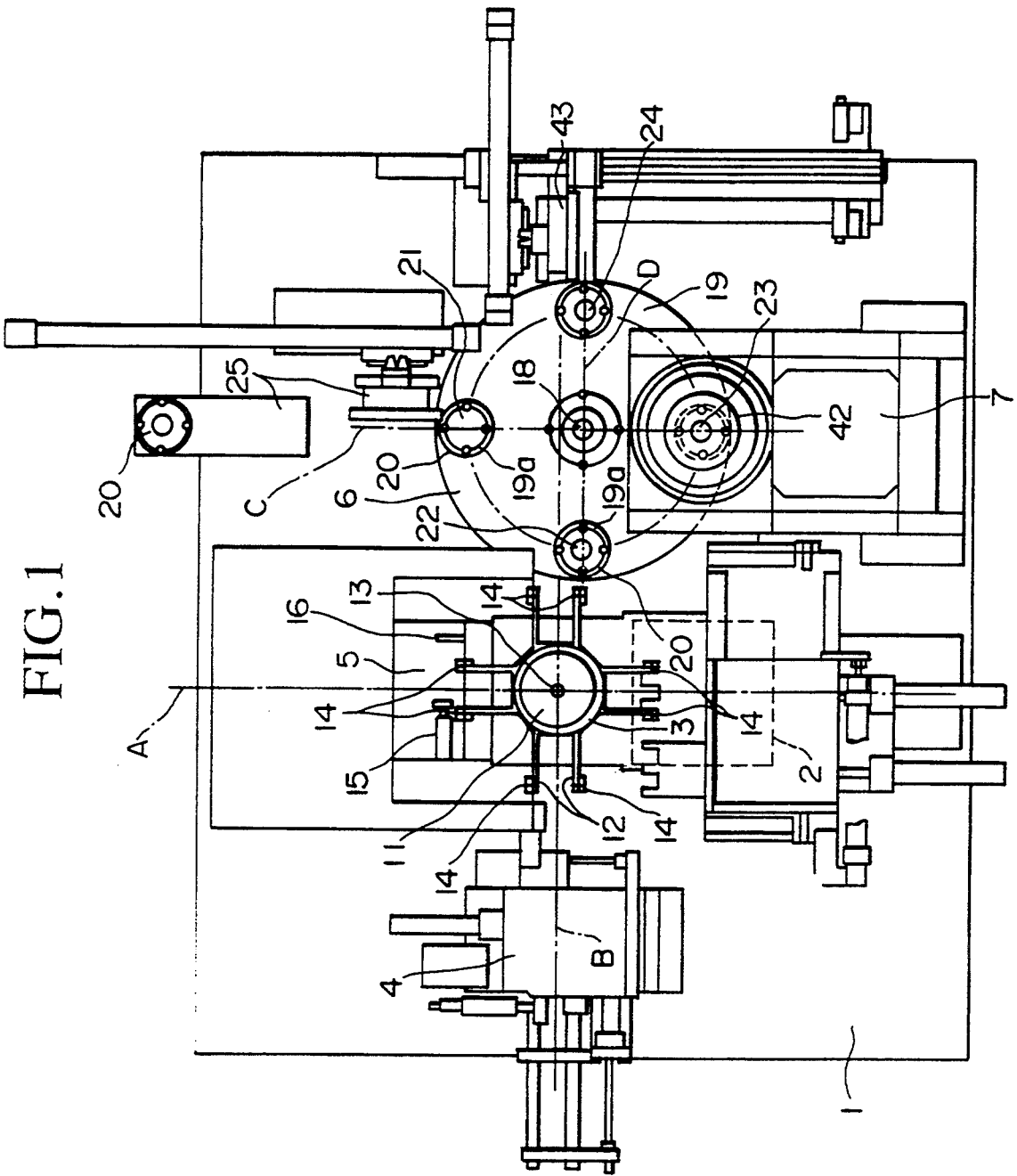
FIG. 1 is a plan view showing an embodiment of the working device for forcing an armature shaft into the through-hole, of an armature core according to the present invention.

FIG. 1 shows an embodiment of a working device for forcing an armature shaft according to the present invention.

The working device comprises a base plate 1, a shaft storage portion 2, a sub-index 3, a device for measuring the length 4, a knurl-working device 5, a main index 6, an armature-core feeder 21, a principal shaft forcing device 7, and an armature-core discharge portion 24.

The shaft storage portion 2 is formed in the form of a box, and is provided above the base plate 1. In the shaft storage portion 2, many columnar armature shafts 8 are stored in a horizontal state. A shaft output gate (not shown) for putting out the armature shafts 8 is provided on the bottom of the shaft storage portion 2. The armature shafts 8 in the shaft storage portion 2 are intermittently transmitted, in order, to the side of the sub-index 3 through the shaft output gate by a well-known means.

The sub-index 3 comprises a turn-table 11 in the form of an equilateral octagon, and 4 pairs of parallel arms 12 projecting from the apexes of the sides of the equilateral octagon of the turn-table 11 which are perpendicular to one another in the form of parallel crosses. The sub-index 3 is provided on the base plate 1 so that the sub-index 3 is rotatable on an axle 13 and is movable up and down. The sub-index 3 has 4 stopping positions for every 90° rotation. Each of the arms 12 has almost the same shape. In addition, a recess 14 in which the armature shaft 8 can be fitted, is formed on each of the ends of the arms 12.

The sub-index 3 is provided adjacent to the shaft storage portion 2 so that the armature shaft 8, transferred from the shaft storage portion 2, can be received to fit in the recesses 14 of the pair of arms 12.

In FIG. 1, the reference character A indicates the straight line passing through the center of the shaft storage portion 2 and the axle 13 of the sub-index 3, and the reference character B indicates the straight line passing through the axle 13 perpendicular to the straight line A. The device for measuring the length 4 is provided on the line B and on one side with respect to the line A. The armature shaft 8 supported and transferred by the pair of arms 12 of the sub-index 3, is supplied to the device for measuring the length 4 by means of a delivering mechanism (not shown). The length of the supplied armature shaft 8 is measured by a length measuring mechanism (not shown) of the device 4. After measurement, the armature shaft 8 is transferred to the sub-index 3, again by the delivering mechanism, to be fitted in the recesses 14 of the pair of arms 12. A generally well-known device for measuring the length can be used as the device for measuring the length 4, therefore, the detailed description thereof is omitted in the specification. The rotation of the sub-index 3 can stop at the positions where the arms 12 are parallel or perpendicular to the line A.

On the opposite side of the shaft storage portion 2 with respect to the sub-index 3, the knurl-working device 5 is provided adjacent to the sub-index 3. The knurl-working device 5 is provided with a cylinder mechanism 15 and a stopper 16 which are spaced in opposition to each other, in a direction parallel with the line B. The cylinder mechanism 15 is provided adjacent to the end of the arm on the side of the device for measuring the length 4 with respect to the line A, and the stopper 16 is provided on the side opposite to the device for measuring the length 4.

The knurl-working device 5 is provided with a press machine (not shown) which comprises a hydraulic cylinder mechanism, and upper and lower dies. The knurl-working device 5 has a construction so that the armature shaft 8 transferred to the knurl-working position can be set in the lower die, one end of the armature shaft 8 touching the stopper 16 and the other end thereof being pushed by the cylinder mechanism 15 so that the armature shaft 8 can be lightly supported by the pressure from the cylinder mechanism 15 and the stopper 16. The armature shaft 8 positioned between the cylinder mechanism 15 and the stopper 16 can be pressed by the upper and lower dies to be knurl-worked on a predetermined portion thereof.

The main index 6 is provided on the opposite side of the device for measuring the length 4 with respect to the sub-index 3, on a position lower than the sub-index 3. The main index 6 has a turn-table 19 which is rotatable on an axle 18. On the periphery of the turn-table 19, four core fitting portions 19a are provided at positions approximately the same distance from the axle 18 and with diameters which divide the circumference of the turn-table 19 into quarters, so that armature cores 20 can be fitted in the four core fitting portions 19a.

The axle 18 of the main index 6 is arranged at a position in the side of the shaft storage portion 2, with respect to the center line B of the sub-index 3, with a predetermined space from the line B.

The reference character C indicates the straight line parallel to the line A, passing through the axle 18 of the main index 6, and the reference character D indicates the straight line passing through the axle 18, parallel to the straight line B. The main index 6 has 4 rotary stopping positions on the lines C and D. That is, the rotation of the main index 6 stops when the armature cores 20 fitted in the four core fitting portions 19a come to one of the 4 positions on the lines C and D. The 4 positions comprise a core-feed stopping position 21, a first shaft forcing stopping position 22, a second shaft forcing stopping position 7, and an armature-core-discharge stopping position 24.

An armature core feeder having an armature core feed mechanism 25 is provided adjacent to the core feed stopping position 21 of the main index 6 so that armature cores 20 can be supplied and fitted into the core fitting portions 19a of the turn-table 19. The armature core feed mechanism 25 comprises a generally well-known conveyer, a generally well-known bringing-down member and the like.

Figure 5:
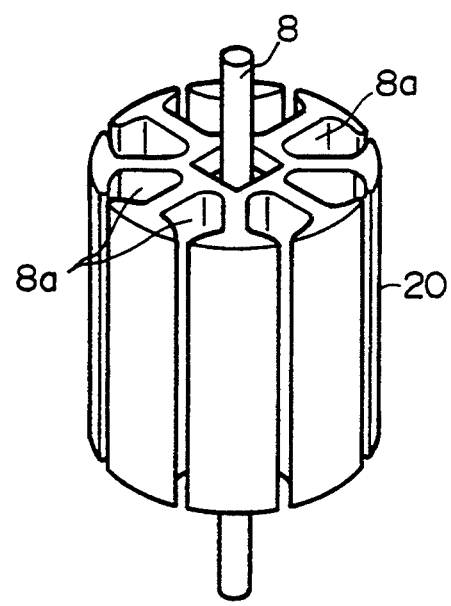
FIG. 5 is a perspective view showing an armature core provided with an armature shaft.

The armature core 20 has approximately a columnar shape, and is provided with a through-hole for a shaft at the center thereof, as shown in FIG. 5. On the side wall of the armature core 20, a plurality of grooves 8a with a predetermined depth extending to the direction of the through-hole are formed at uniform intervals. In the embodiment as shown in FIG. 5, 8 grooves are formed on the side wall of the core 20. An armature shaft 8 is inserted into the through-hole of the core 20.

Figure 2:
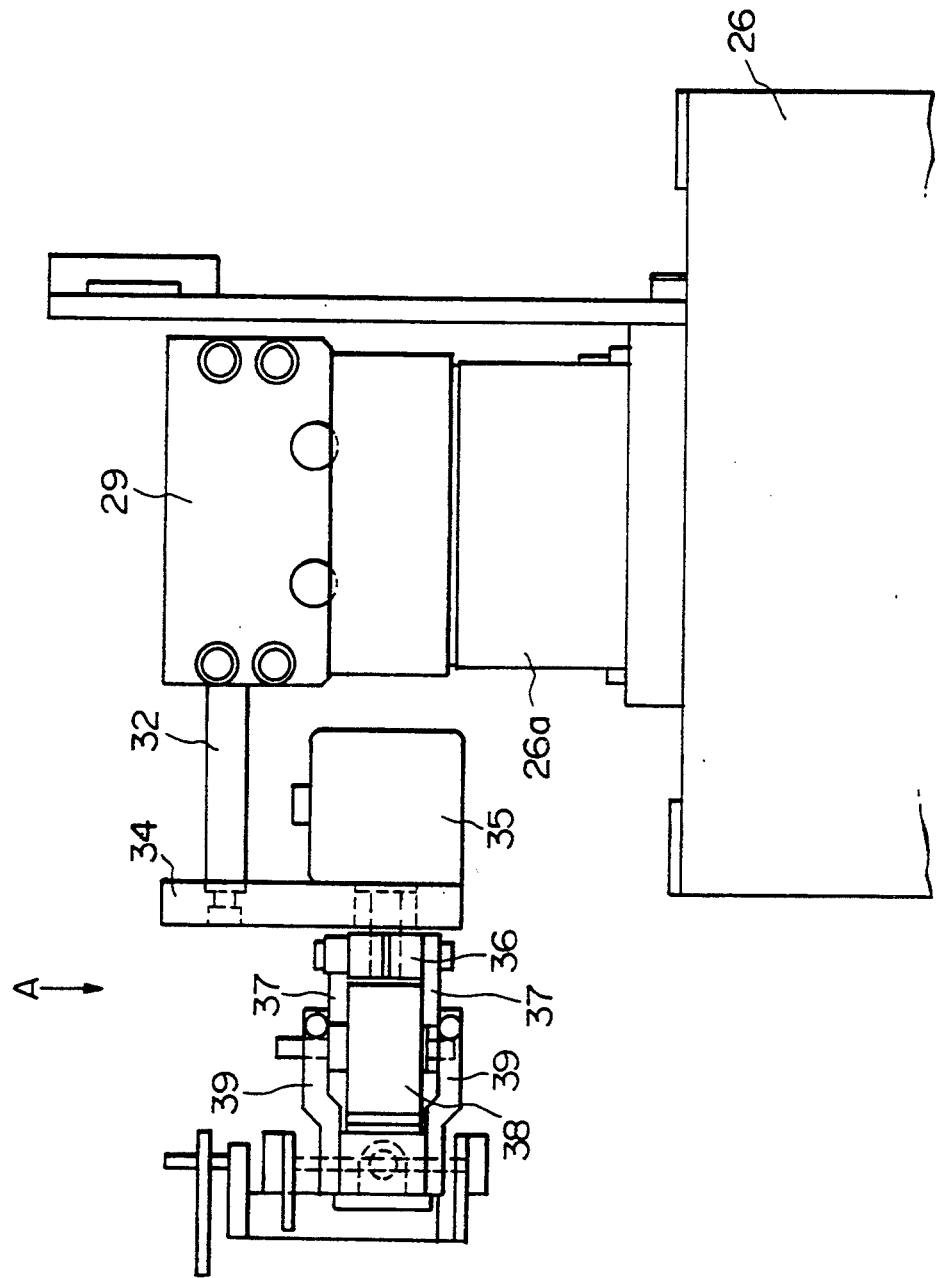
FIG. 2 is a plan view showing a first shaft forcing means according to an embodiment of the present invention.
Figure 3:
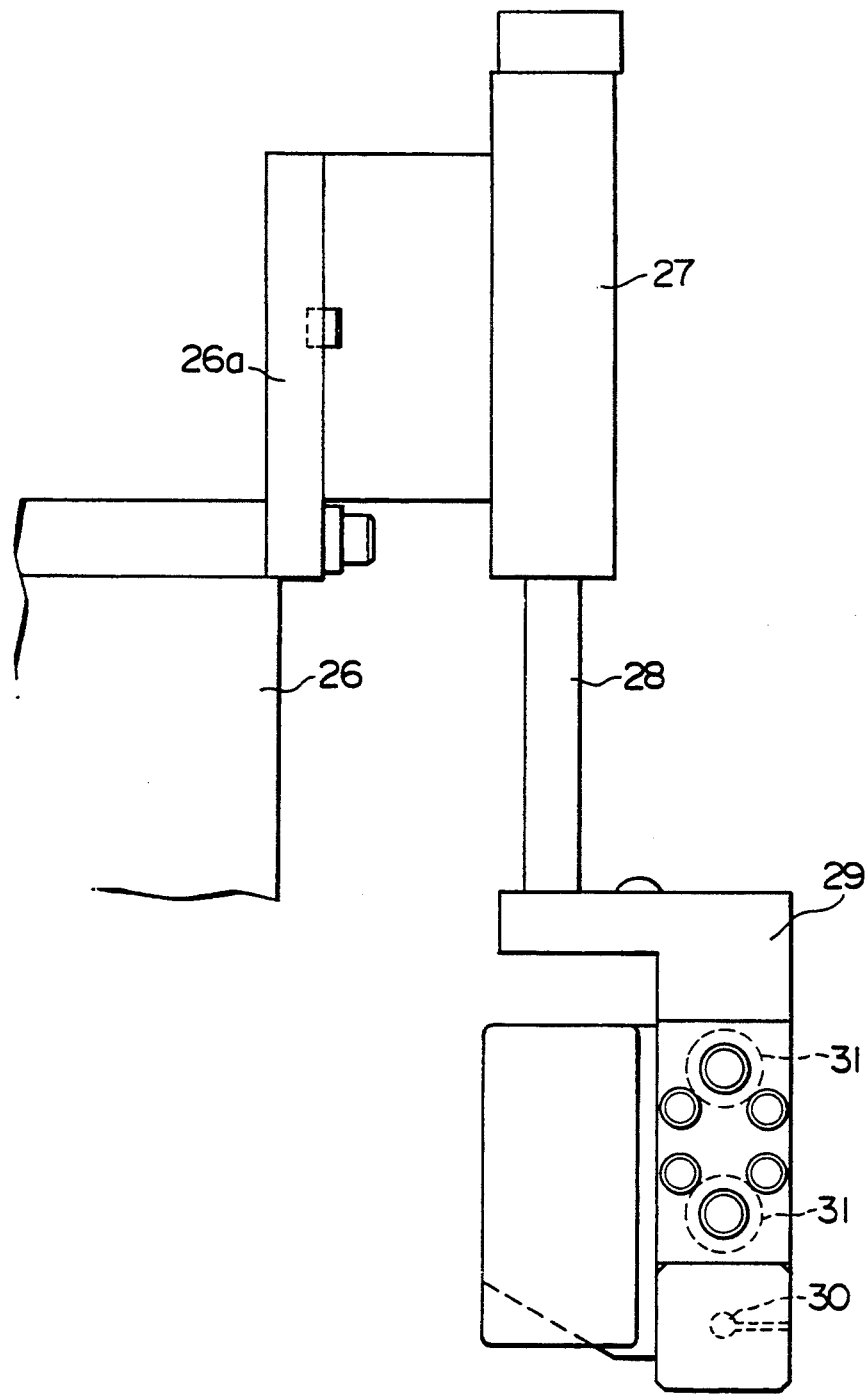
FIG. 3 is a side view showing the principal part of an embodiment according to the present invention.
Figure 4:
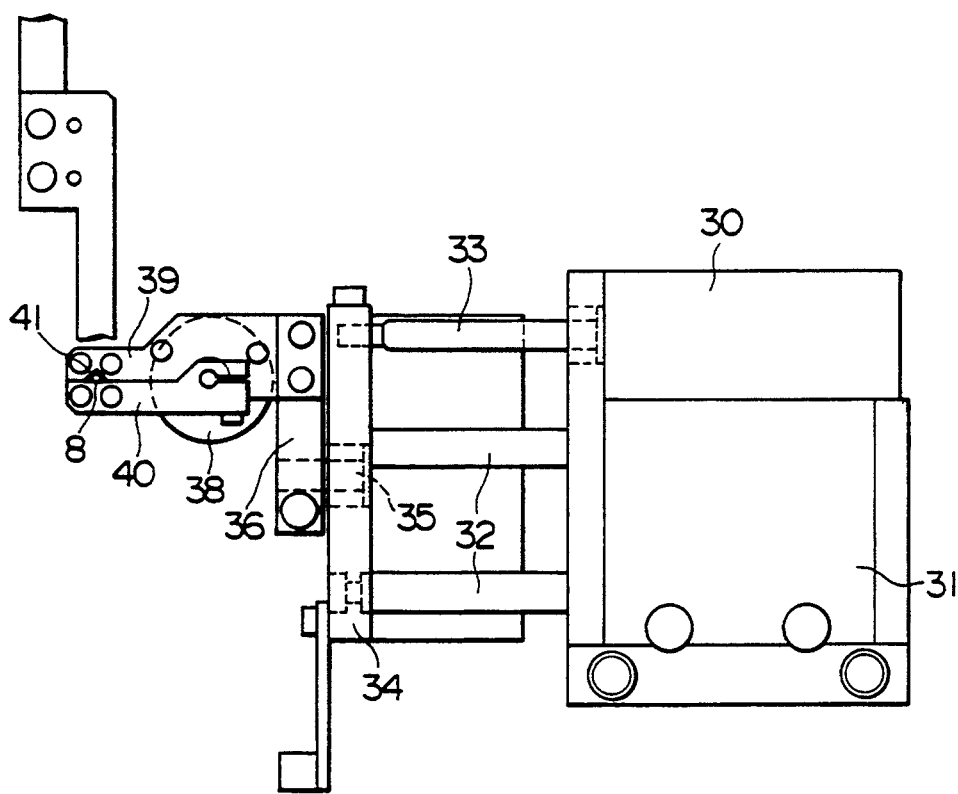
FIG. 4 is a side view from an arrow A showing a first shaft forcing means of FIG. 2.

A first shaft forcing portion for inserting the armature shaft 8 into the through-hole of the core 20 is shown in FIGS. 2 through 4. In these FIGURES, a support 26 is provided at a predetermined position on the base plate 1. A cylinder mechanism 27 with a piston rod 28 is attached on the support 26 through a bracket 26a so that the piston rod 28 is movable in a vertical direction. Upper and lower guide portions 31, 31 and a cylinder mechanism 30 are attached to the bottom end of the piston rod 28 through an attachment 29. The upper and lower guide portions 31, 31 are spaced to each other, and each of them has a horizontal ball-spline mechanism. A connecting plate 34 is attached to the ends of rods 32, 32 provided on the guide portions 31, 31 and to the end of a piston rod 33 of the cylinder mechanism 30, as shown in FIG. 4. The connecting plate 34 can be moved in the direction of the line B, as shown in FIG. 1, by the drive of the cylinder mechanism 30.

As shown in FIG. 2, a rotary actuator 35 with a horizontal rotary axle is provided on the connecting plate 34 in the side of the attachment 29. The rotary axle of the rotary actuator 35 projects and passes through the connecting plate 34. The side portion of one end of a whirling arm 36 is fixed to the rotary axle of the rotary actuator 35. A rotary actuator 38 is provided on the other end of the whirling arm 36 through brackets 37, 37 so that the rotary actuator 38 is arranged between the brackets 37, 37. The rotary axle of the rotary actuator 38 is directed to the direction perpendicular to the axle of the rotary actuator 35.

Two lower shaft receiving plate 39, 39 in the form of a lower bill are fixed on the brackets 37, 37, as shown in FIGS. 2 and 4. Two upper rotatable plates 40, 40 in the form of a upper bill are provided on the upper side of the lower shaft receiving plate 39, 39. The base ends of the rotatable plates 40, 40 are attached to the rotary axle of the rotary actuator 38 in a detachable manner, so that the rotatable plates 40, 40 can rotate together with the rotary axle of the rotary actuator 38. The shaft receiving plates 39, 39 are provided with grooves 41, 41 in the form of a character V, which are parallel to the rotary axle of the rotary actuator 38 at predetermined positions in the vicinity of the free end thereof, so that the armature shaft 8 can be fitted in the grooves 41, 41. The armature shaft 8 fitted in the grooves 41, 41 in the form of a character V, can be sandwiched by the shaft receiving plate 39, 39 and the rotatable plates 40, 40 to be held.

As described above, in the construction of the first shaft forcing portion, the armature shaft 8 received from the sub-index 3 can be rotated by 90°, and inserted vertically into the armature core 20 fitted on the turn-table 19.

The second shaft forcing portion 7 is provided with a vertical cylinder mechanism (not shown) attached to a supporting plate (not shown) which is hanging down and provided on the base plate 1. A stopper (not shown) is provided on the upper end of a piston rod of the cylinder mechanism. The stopper is supported by the cylinder mechanism and provided with a device for measuring the length. A shaft pushing mechanism 42 is provided on the supporting plate erected on the base plate 1. The inserted armature shaft 8, at the second shaft forcing stopping position, is forced in the through-hole of the armature core 20 to the predetermined depth by means of the shaft-pushing mechanism 42. At the same time, the amount of the armature shaft 8 inserted into the armature core 20, is measured by the device for measuring the length.

A core discharge mechanism 43 is provided adjacent to the armature-core-discharge stopping position 24 of the main index 6. The armature core 20 fitted into the core-fitting portions 19a of the turn-table 19 is discharged outside of the main index 6 at the core-discharge stopping position 24, by the core-discharge mechanism 43. The core discharge mechanism 43 comprises a generally well-known conveyer, a generally well-known bringing-down member and the like.

The armature-core feeder, the sub-index 3, the main index 6, the first shaft forcing portion, the principal (second) shaft forcing portion 7, the armature core-discharge portion and the like are automatically driven by a control device (not shown) that appropriately controls the sequence.

The function of the working device for forcing an armature shaft according to the present invention will be explained as follows.

After many armature shafts 8 are stored in the shaft storage portion 2 in a horizontal state, the working device is operated. In this state, as shown in FIG. 1, the armature shafts 8 are intermittently supplied to the side of the sub-index 3 from the bottom of the shaft storage portion 2 one by one, at properly timed intervals. An armature shaft 8 is fitted in the recess 14 of the pair of arms 12 and is supported by the arms 12 which are at the stopping position adjacent to the shaft storage portion 2, by the sub-index 3 lifting from the lower position. Thereafter, the sub-index 3 rotates horizontally by 90° in a clockwise direction and stops at the position where the pair of arms 12, supporting the armature shaft 8, are adjacent to the device for measuring the length 4.

At the position, the sub-index 3 descends to transfer the armature shaft 8 from the arms 12 to the device for measuring the length 4. The length measurement for the armature shaft 8 is carried out in the device for measuring the length 4, while the sub-index 3 stops at the lower position. When the armature shaft 8 comes up to the standard for length measurement, the measured armature shaft 8 is transferred again from the device for measuring the length 4 to the sub-index 3. At this time, the armature shaft 8 is fitted into the recess 14 of the pair of arms 12 by lifting the sub-index 3. Thereafter, the sub-index 3 further rotates horizontally by 90° in a clockwise direction and stops at the position adjacent to the knurl-working portion 5. When the armature shaft 8 does not come up to the standard for length measurement, the measured armature shaft 8, is not transferred from the device for measuring the length 4 to the sub-index 3. The sub-index 3 having the arms 12 without an armature shaft 8 ascends and rotates horizontally 90° in a clockwise direction. Another armature shaft 8 supported by another pair of arms 12, is transferred to the length measuring stopping position and is supplied to the device for measuring the length 4.

After the arms 12 supporting the armature shaft 8 stops at the knurl-working stopping position, adjacent to the knurl-working portion 5, the sub-index 3 descends to transfer the armature shaft 8 from the arms 12 to the lower die of the press machine located between the cylinder mechanism 15 and the stopper 16, in the knurl-working portion 5. One end of the armature shaft 8, set in the lower die, touches the stopper 16. The other end thereof, is pushed by the cylinder mechanism 15 so that the armature shaft 8 can be lightly supported by the pressure from the cylinder mechanism 15 and the stopper 16. Thereafter, the armature shaft 8, positioned between the cylinder mechanism 15 and the stopper 16, is pressed by the upper and lower dies to be knurl-worked on a predetermined portion thereof. The knurl-worked armature shaft 8 is fitted in the recess 14 of the pair of arms 12 by ascension of the sub-index 3 at the knurl-working stopping position.

Thereafter, the sub-index 3 further rotates horizontally by 90° in the clockwise direction, and the arms 8 supporting the knurl-worked armature shaft 8 stops at the position adjacent to the first shaft forcing stopping position 22 of the main index 6.

Then, the cylinder mechanism 30 is operated to extend the piston rod 33, when the rotatable plates 40 is opened with respect to the shaft receiving plates 39, and when the shaft receiving plates 39 are at a lower position than that of the armature shaft 8 supported by the stopping arms 12, at the position adjacent to the first shaft forcing stopping position 22. At the same time, the sub-index 3 descends to fit both ends of the armature shaft in the V-shaped grooves 41 of the shaft receiving plates 39. Thereafter, the rotary actuator 38 is operated to rotate the rotatable plates 40 to the side of the shaft receiving plates 39, thereby the armature shaft 8 is sandwiched and supported by the shaft receiving plates 39 and the rotatable plates 40.

Next, the cylinder mechanism 30 is operated to pull in the piston rod 33 thereof by a predetermined length. The rotary actuator 35 is operated to rotate the armature shaft 8 90° through the whirling arm 36, the brackets 37, 37, the shaft receiving plate 39, 39, and the rotatable plates 40, 40. Accordingly, the armature shaft 8 becomes vertical.

While the armature shaft 8 is transferred from the arms 12 to the shaft receiving plate 39, 39 and is made vertical, another armature core 20 is supplied to the core-fitting portions 19a on the turn-table 19 by the armature core-feed mechanism 25, at the armature core-feed stopping position 21. Accordingly, the armature core 20 is fitted in the core fitting portions 19a on the turn-table 19 so that the center through-hole of the armature core 20 is vertically directed. While the armature shaft 8 is vertically held, the main index 6 rotates horizontally by 90° in a counterclockwise direction, (i.e., in the rotational direction reverse to that of the sub-index 3), and the turn-table 19 stops when the fitted armature core 20 thereon arrive at the first shaft forcing stopping position 22.

Next, the cylinder mechanism 27 is operated to extend the piston rod 28, so that the lower end of the armature shaft 8, sandwiched between the shaft receiving plates 39 and the rotatable plates 40, is inserted into a guide pipe (not shown). The armature shaft 8 descends together with the guide pipe so that the other end of the guide pipe is positioned to the end of the through-hole of the armature core 20. Then, the rotary actuator 38 is operated to open the rotatable plates 40 with respect to the shaft receiving plates 39, so that a part of the armature shaft 8 is inserted into the through-hole of the armature core 20, passing through the guide pipe. The rotary actuator 38 is operated to close the rotatable plates 40 with respect to the shaft receiving plates 39. The cylinder mechanism 30 is operated to pull in the piston rod 33 thereof so that can be sent away the shaft-receiving plates 39 and the rotatable plates 40 from the vicinity of the armature shaft 8. The rotary actuator 35 is operated to restore the whirling arm 36, the brackets 37, 37, the shaft receiving plate 39, 39, and the rotatable plates 40, 40 to the original state. A pressure mechanism (not shown), such as a cylinder mechanism or the like, is provided above the armature shaft 8 and the upper end of the guide pipe. In this state, a rod (not shown) provided on the lower end of the pressure mechanism is taken down in the guide pipe by the pressure mechanism, so that the armature shaft 8 in the guide pipe is forced in the through-hole of the armature core 20 by a predetermined length. Then, both the guide pipe and the rod are lifted up by cylinder mechanisms (not shown) to be apart from the armature shaft 8 and the armature core 20.

Thereafter, the main index 6 rotates horizontally by 90° in the counterclockwise direction, and the turn-table 19 stops when the armature core 20 with an inserted armature shaft 8 arrives at the second shaft forcing stopping position 23. At this position, the armature shaft 8 is completely forced into the armature core 20 up to a predetermined depth.

The main index 6 then rotates horizontally by 90°, in a counterclockwise direction, and the turn-table 19 stops when the armature core 20 with a completely forced armature shaft 8 arrives at the armature core-discharge stopping position 24. At this position, the armature core 20 is discharged outside of the turn-table 19.

While the shaft receiving plate 39, 39, the rotatable plates 40, 40 and the like are restored to the original state, and after the armature shaft 8 is vertically held above the pipe at the first shaft forcing stopping position 22, the sub-index 3 ascends from the lower position and rotates horizontally by 90° in a clockwise direction. At this time, the arms 12 which previously carried the armature shaft 8 to be forced is in a position adjacent to the shaft storage portion 2 and ready to receive the next armature shaft 8 from the storage portion 2 by subsequent descending and ascending of the sub-index 3.

Thus, the sub-index 3 transfers the armature shaft 8 to the four positions surrounding the sub-index 3 continuously by descending, ascending, and rotating thereof. The turn-table 19 rotates synchronously to the sub-index 3, though their phases are a little different from each other. The turn-table 19 continuously transfers the armature core 20, with or without an armature shaft 8, forced in the through-hole thereof to the four positions on the periphery of the turn-table 19.

As described above, according to the embodiment, it is possible to supply the armature core 20 and the armature shaft 8 to the machine, (i.e., the working device for forcing an armature shaft, to knurl-work the armature shaft 8), to force the armature shaft 8 in the through-hole of the armature core 20, and to discharge the armature core 20 with a forced armature shaft 8 outside of the machine, by means of a series of mechanisms of the machine.

Accordingly, it is not necessary to ascertain the kind of armature shaft and the forcing direction of the armature shaft 8 by the aid of human power. Also, this determination does not require a long time and minimizes the possibility of making an incorrect ascertainment, with respect to the kind of armature shaft and the forcing direction of the shaft 8. Furthermore, it is possible to automatically force the armature shaft into the through-hole of an armature core precisely, without the aid of human power.

In the above described embodiment, 4 pair of arms 12 are provided on the sub-index 3, armature cores 20 are fitted in 4 core fitting positions with equal intervals on the periphery of the main index 6, and each of the sub-index 3 and the main index 6 can stop at 4 stations. However, it is not necessary to limit to the numbers of the pair of arms 12, the numbers of the fitting positions on the periphery of the main index 6, and the numbers of the stations of the sub-index 3 and the main index 6. The number of them can be appropriately increased.

As described above, the working device for forcing an armature shaft according to the present invention comprising: a sub-index which can support an armature shaft to transfer to predetermined plural stopping positions, the sub-index having a first stopping position adjacent to a shaft storage means for storing armature shafts, and a second stopping position adjacent to a knurl-working means for carrying out a knurl-working to the armature shaft; a main index which can support an armature core to transfer to predetermined plural stopping positions, the main index having a core feed stopping position at which an armature core is fed by an armature core feed means, a shaft forcing stopping position at which the armature shaft supplied from the sub-index side is forced into the through-hole of the armature core by a shaft forcing means, and a discharge stopping position from which the armature core with the forced armature shaft is discharged outside of the main index.

Therefore, according to the present invention, it is possible to supply the armature core 20 and the armature shaft 8 to the machine, to knurl-work the armature shaft 8, and to force the armature shaft 8 in the through-hole of the armature core 20 by means of a series of mechanisms of the machine.

Accordingly, it is unnecessary to ascertain the kind of armature shaft and the forcing direction of the shaft 8 by the aid of human power. This determination does not require a long time and minimizes the possibility of making an incorrect ascertainment, with respect to the kind of armature shaft and the forcing direction of the shaft 8. In addition, it is possible to automatically force the armature shaft into the through-hole of an armature core precisely, without the aid of human power.

What is claimed is:

1. A device for forcing an armature shaft a predetermined distance into a bore of an armature core of an electric motor, comprising:

a first turret rotationally mounted to a base, said first turret being adapted to receive an armature shaft at a first receiving point of said first turret and support said received armature shaft throughout the rotation of said first turret, said first turret being stopable at stop-points spaced around the first turret;

means for storing and individually supplying armature shafts to said first receiving point of said first turret, said storing and supplying means being located at a first stop-point;

means for forming a knurl along a portion of the armature shaft, said knurl forming means being operational at a second stop-point, said second stop-point being spaced from said first stop-point along the periphery of the first turret;

a second rotationally mounted turret for supporting armature cores at predetermined core-receiving positions on said second turret, said rotation of said second turret transporting said received cores to predetermined stop-points located about said second turret;

means for individually supplying armature cores to said core-receiving positions on said second turret, said core supplying means being located at a first stop-point of said second turret;

means for aligning said knurled armature shaft with the bore of an armature core;

means for pressing the knurled armature shaft into the bore of the armature core; and means for removing said armature cores having a pressed armature shafts from said second turret at a second stop-point.

2. The device according to claim 1, wherein said first turret is horizontally rotatable about a first axis and includes plural pairs of radially directed arms spaced along its periphery, each pair of said arms are horizontally disposed and generally parallel to each other, said arms include recesses adapted to receive and support an armature shaft horizontally.

3. The device according to claim 2, wherein said first turret can be vertically displaced along said first axis.

4. The device according to claim 1, wherein the pressing means comprises a means for receiving the knurled armature shaft from the first turret and for initial pressing said armature shaft into said bore of the armature core to a first predetermined depth, and a means for final pressing said armature shaft into said bore of said armature core to a second predetermined depth, said receiving and initial pressing means being performed at a third stop-point about said second turret, while said final pressing means being performed at a fourth stop-point about said second turret.

5. The device according to claim 1, further including means for transferring the knurled armature shaft from the first turret to an armature core located on said second turret, said transferring means being performed at a third stopping position of said second turret.

6. The device according to claim 1, further comprising means to measure the length of said armature shafts, said length measuring means being located adjacent said first turret at a fourth stop-point.

7. The device according to claim 5, further comprising means to measure the length of said armature shafts, said length measuring means being located adjacent said first turret at a fourth stop-point.

8. The device according to claim 1, wherein the knurling means knurls a portion of the armature shaft which is off-centered with respect to the length of said shaft.

9. The device according to claim 1, wherein the second turret includes a horizontally rotatable turn-table, said turn-table includes along its periphery, a plurality of core receiving portions for receiving and supporting said armature cores at approximately evenly spaced intervals about said periphery.

10. The device according to claim 4, wherein the knurled armature shaft supported horizontally by the first turret is re-oriented to a vertical orientation as it is transferred to the first shaft pressing means so said shaft will align with the vertically disposed bore of the armature core.

11. A device for securing an armature shaft in a central bore of an armature core of an electric motor, comprising:

a horizontally rotatable first turret for supporting an armature shaft at a predetermined position, transferring the armature shaft, and having a plurality of predetermined stopping positions, wherein said first turret includes plural pairs of radially directed arms spaced along its periphery, each pair of said arms are horizontally disposed and generally parallel to each other, said arms include recesses adapted to receive and support an armature shaft horizontally, means for storing and individually supplying armature shafts to said first receiving point of said first turret, said storing and supplying means being located at a first stop-point;

means for forming a knurl along a portion of the armature shaft, said knurl forming means being operational at a second stop-point, said second stop-point being spaced from said first stop-point along the periphery of the first turret;

a second rotationally mounted turret for supporting armature cores at predetermined core-receiving positions on said second turret, said rotation of said second turret transporting said received cores to predetermined stop-points located about said second turret;

means for individually supplying armature cores to said core-receiving positions on said second turret, said core supplying means being located at a first stop-point of said second turret;

means for initial pressing the knurled armature shaft into the bore of the armature core to a first predetermined depth;

means for final pressing said knurled armature shaft into said bore to a second predetermined depth means for removing said armature cores having a pressed armature shaft from said second turret.

12. The device according to claim 11, wherein said first turret can be vertically displaced along said first axis.

13. The device according to claim 11, wherein the first turret further includes means for transferring a knurled armature shaft from the first turret to the armature core located on said second turret.

14. The device according to claim 11, wherein the first turret further includes means for measuring the length of said armature shaft, said length measuring means being located at a fourth stop-point adjacent said first turret.

15. The device according to claim 13, wherein the first turret further includes means for measuring the length of said armature shaft, said length measuring means being located at a fourth stop-point adjacent said first turret.

16. The device according to claim 11, wherein the knurled armature shaft supported horizontally by the first turret is re-oriented to a vertical orientation as said shaft is transferred to said initial shaft pressing means so that said shaft aligns with the vertically disposed bore of said armature core.

* * * * *